United States Patent [19]
Jongema

[11] Patent Number: 5,221,528
[45] Date of Patent: Jun. 22, 1993

[54] PROCESS FOR THE PREPARATION OF SODIUM CHLORIDE

[75] Inventor: Pieter Jongema, Brummen, Netherlands

[73] Assignee: Akzo N.V., Netherlands

[21] Appl. No.: 815,090

[22] Filed: Dec. 27, 1991

[30] Foreign Application Priority Data

Dec. 28, 1990 [NL] Netherlands ............ 90028833

[51] Int. Cl.$^5$ ............................................. C01D 3/00
[52] U.S. Cl. .................... 423/499.1; 423/179; 423/191; 423/184; 423/192; 423/197; 423/193; 423/199; 423/186; 23/302 T; 23/303
[58] Field of Search .............. 423/179, 191, 192, 197, 423/499, 551, 186, 184, 155, 164, 166, 165, 193, 199, 499.1; 23/302 T, 303

[56] References Cited

U.S. PATENT DOCUMENTS

| | | | |
|---|---|---|---|
| 658,303 | 9/1900 | Vis | 423/193 |
| 2,191,411 | 12/1938 | Pierce, Jr. | 423/193 |
| 2,433,601 | 12/1947 | Comstock | 423/193 |
| 2,624,654 | 1/1953 | Hirsch | 23/42 |
| 2,764,472 | 9/1956 | William et al. | 23/42 |
| 3,712,797 | 1/1973 | Winkler | 23/296 |
| 3,925,027 | 12/1975 | Fiedelman | 23/296 |
| 4,026,676 | 5/1977 | Fiedelman | 23/298 |
| 4,180,547 | 12/1979 | Chirico | 423/197 |
| 4,246,241 | 1/1981 | Mathur et al. | 423/179 |
| 4,547,197 | 10/1985 | Winkler | 23/302 T |

FOREIGN PATENT DOCUMENTS 0427972 5/1991 European Pat. Off. .

OTHER PUBLICATIONS

Chem Abst. No. 76148u vol. 109, No. 10, p. 162 (1988).
Chem. Abst. No. 206951q vol. 93, No. 22, p. 140 (1980).
Chem. Abst. No. 7093v, vol. 91, No. 2, p. 118 (1979).

*Primary Examiner*—Theadore Morris
*Assistant Examiner*—Edward Squillante
*Attorney, Agent, or Firm*—Ralph J. Mancini; Louis A. Morris

[57] ABSTRACT

In a purification process for brine, impurities such as calcium, magnesium and/or sulphate are precipitated by the addition of calcium hydroxide (Ca(OH)$_2$) and sodium carbonate (Na$_2$CO$_3$). Following NaCl crystallization by evaporation of the brine, a mother liquor is obtained which still contains among others sulphate, potassium and bromide ions. Further concentration of this mother liquor by evaporation results in the precipitation of both NaCl and Na$_2$SO$_4$ and a more strongly concentrated mother liquor with respect to both potassium and bromide remains. This concentrated mother liquor is drained off. Either the precipitated NaCl and Na$_2$SO$_4$ are dissolved in water or the Na$_2$SO$_4$ is dissolved in purified brine or crude brine and then returned to the brine purification process, thereby lowering both the potassium and bromide ion levels in the purified brine. As a consequence the contents of both potassium and bromide of the NaCl are reduced.

6 Claims, 3 Drawing Sheets

PROCESS FOR THE PREPARATION OF SODIUM CHLORIDE

The invention relates to a process for the preparation of sodium chloride comprising the purification of crude brine by precipitating and separating calcium and magnesium in the form of insoluble compounds, followed by evaporating water from the obtained purified brine and separating the sodium chloride crystallised in the process, followed by returning the sodium sulphate present in the mother liquor to the crude brine.

Such a process is known from United States patent specification U.S. Pat. No. 2 764 472. In this patent specification a process is described in which mother liquor containing sodium sulphate is returned to the crude brine. The drawback to this process is that it gives high-level concentrations of ions such as $K+$ and $Br-$ in the solutions undergoing the various treatments, and that because these ions have a tendency to be built into the crystal lattice of NaCl in the course of its crystallisation, the desired product NaCl will have relatively high potassium and bromide contents as a consequence.

SUMMARY OF THE INVENTION

The primary objective of the present invention is to eliminate the above drawback.

Accordingly, the present invention is a process for the preparation of sodium chloride comprising the purification of crude brine by precipitating and separating calcium and magnesium in the form of insoluble compounds, followed by evaporating water from the obtained purified brine and separating the sodium chloride crystallized in the process, followed by crystallizing and separating sodium sulfate from the mother liquor and returning the sodium sulfate to the crude brine to be purified.

This process enables the extraction from crude brine of a very pure NaCl. The NaCl salt to be obtained by this process has a very low bromine content and so has been rendered suitable for use in a wide range of applications.

DETAILED DESCRIPTION OF THE INVENTION

Figure 1:
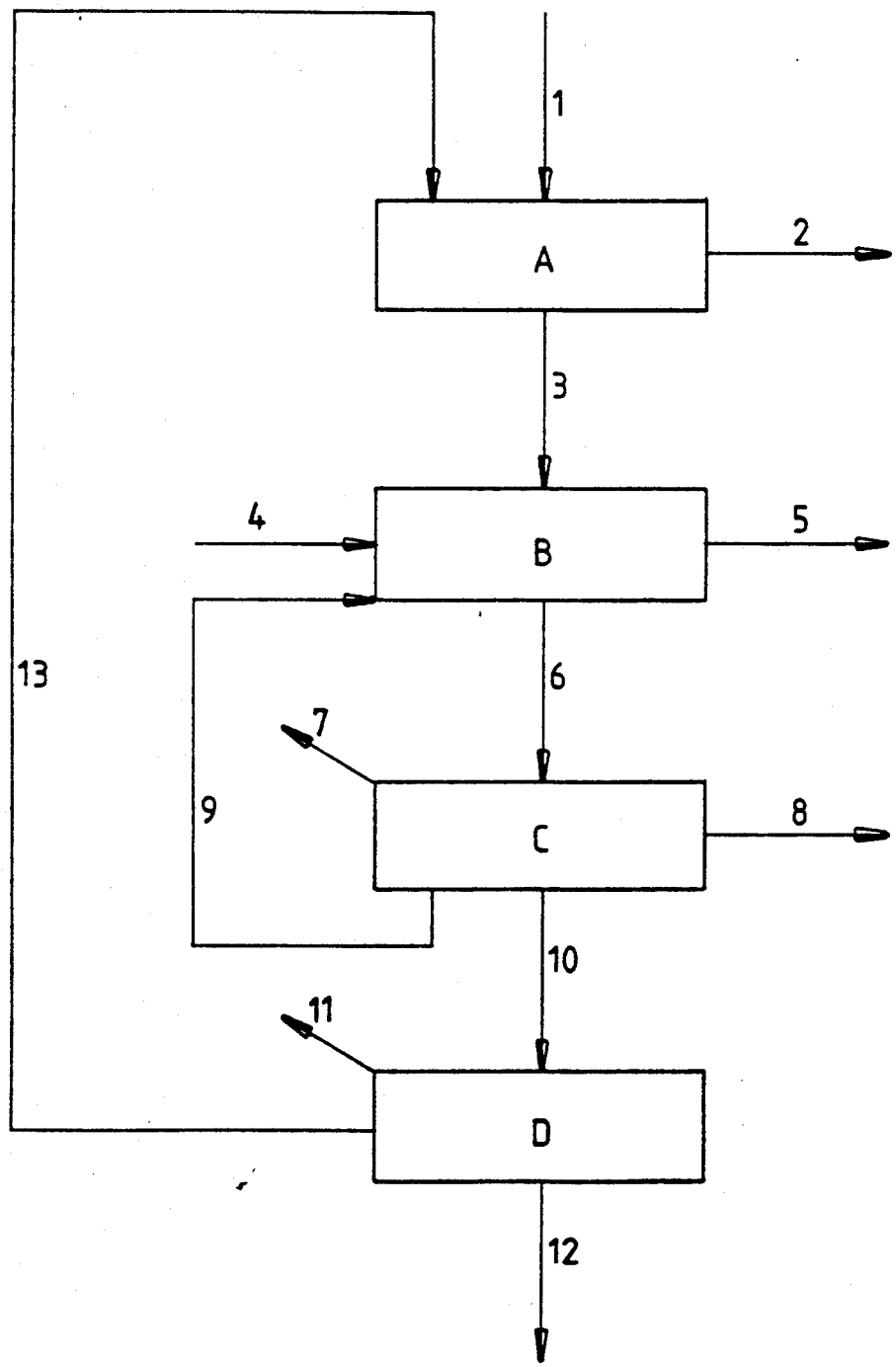
FIGS. 1 and 2 are schematic depictions of various embodiments of the present invention.

Crude brine serves as raw material for the process according to the present invention. Crude brine contains, in addition to $Na+$ and $Cl-$, a great many other ions, e.g. those of calcium, magnesium, sulphate, potassium, and bromide. To remove calcium and magnesium ions from the brine sodium carbonate and calcium hydroxide may be added to form calcium carbonate and magnesium hydroxide, respectively, which are subsequently removed. However, it is also possible for calcium ions to be precipitated and removed in another effective manner by adding sulphate ions to form insoluble calcium sulphate. The brine from which the calcium and magnesium have been removed is referred to hereinafter as purified brine. Next, water is evaporated from the purified brine to the extent of NaCl crystallising, but without the $Na_2SO_4$ solubility limit being exceeded, this to prevent the NaCl to be crystallized from being contaminated with sulphate. After the crystallized NaCl has been removed, mother liquor is left. If so desired, part of the mother liquor can be returned to the brine purification step to regulate the quality of the sodium chloride product.

From the mother liquor not so returned further water is evaporated. In this evaporation step the $Na_2SO_4$ solubility limit is exceeded and there is crystallization of $Na_2SO_4$ as well as of the NaCl still present in the mother liquor. As the mother liquor is concentrated further, the dissolved impurities' contents become higher. In a preferred embodiment the evaporation can be continued until the solubility limit of the double salt $K_3Na(SO_4)_2$ is reached. Exceeding this solubility limit might result in reduction of the yield of pure NaCl. The sodium sulphate crystals are separated from the liquid together with sodium chloride crystals. The remaining liquid obtained in this manner, which is referred to as "concentrated mother liquor" hereinafter, has a small volume but contains a high concentration of dissolved impurities. This concentrated mother liquor is removed from the process cycle.

The water may be evaporated from the mother liquor at any temperature conventionally used for the evaporation of purified brine. Such a temperature is in the range of 35° to 160° C.

In order to attain the highest possible use of sulphate in the precipitation of gypsum, the $Na_2SO_4$ obtained during the evaporation of the mother liquor should preferably be returned to the cycle in the dissolved form. Practically, this can be effected in at least three ways.

1. The obtained $Na_2SO_4$ and NaCl crystal mixture is dissolved in water. The resulting solution is fed to the brine purification process.

2. The obtained $Na_2SO_4$ and NaCl crystal mixture is suspended in such an amount of purified brine that all of the $Na_2SO_4$ is dissolved in it. Obtained in that case is a solution saturated with NaCl and having an $Na_2SO_4$ content which, at most, equals the $Na_2SO_4$'s solubility. Since, generally, the NaCl content of the purified brine is not very much lower than the NaCl solubility, only a minor portion of the NaCl crystals is dissolved in this process After the remaining NaCl crystals have been separated as product, the resulting solution is fed to the brine purification process. This process is preferred, as it does not involve adding water to the cycle which later has to be evaporated and so does not bring about an extra increase in energy consumption.

3. The obtained $Na_2SO_4$ and NaCl crystal mixture is suspended in such an amount of crude brine that all of the $Na_2SO_4$ can be dissolved in it. Obtained then is a solution saturated with NaCl and having an $Na_2SO_4$ content which, at most, equals the $Na_2SO_4$'s solubility. Since the NaCl content of the purified brine often is not very much lower than the NaCl solubility, only a minor portion of the NaCl crystals is dissolved in this process. After the remaining NaCl crystals have been separated as product the resulting solution is fed to the brine purification process. Preferably, the amount of crude brine to which the mixture of NaCl and $Na_2SO_4$ is added is chosen such that the brine's sulphate content after complete dissolving of the $Na_2SO_4$ at room temperature does not exceed 0,22 gram-ion/liter. It was found that this will substantially accelerate the $Na_2SO_4$ crystal's dissolving in the brine.

According to a preferred embodiment, the product of the $Ca^{2+}$ ion content and the sulphate content of the brine after complete dissolution of the $Na_2SO_4$ at room temperature does not exceed $7.5 \times 10^{-3}$ (gram-ion/liter)$^2$. It was found that this will substantially extend the period of time before gypsum precipitates.

Thus, it is possible to separate the NaCl crystals before the precipitation of CaSO$_4$.2H$_2$O, so preventing contamination of the NaCl crystals with said compound.

The NaCl produced according to the new found process is highly suitable especially for the production of chlorine. On account of its very low bromine content, this chlorine is particularly suited to be used in the production of chlorine derivatives.

The invention will be further illustrated by the following figures and examples. These figures and examples are not to be construed as limiting in any manner the scope thereof.

FIG. 1 is a schematic depiction of a flow chart for the above-disclosed novel process.

Crude brine (1) and a mixture containing Na$_2$SO$_4$ and NaCl crystals (13) are fed to a dissolver (A), where te Na$_2$SO$_4$ crystals are dissolved in the crude brine. The NaCl crystals (2) are removed from the dissolver (A), the crude brine enriched with Na$_2$SO$_4$ (3) is passed from the dissolver (A) into one or more vessels (B), in which the crude brine is purified. As various compounds (4) are added, impurities (5) precipitate and are separated and removed from (B). Purified brine (6) is fed to a brine evaporator (C). In the brine evaporator water (7) evaporates, while NaCl (8) crystallizes and after separation is removed from the brine evaporator. If desired, part of the mother liquor (9) is returned to (B). The remaining mother liquor (10) is fed to a mother liquor evaporator (D). In the mother liquor evaporator (D) water (11) evaporates, while Na$_2$SO$_4$ and NaCl (13) crystallize and are returned to the dissolver (A). The concentrated mother liquor (12) is drained off from the mother liquor evaporator (0).

Figure 2:
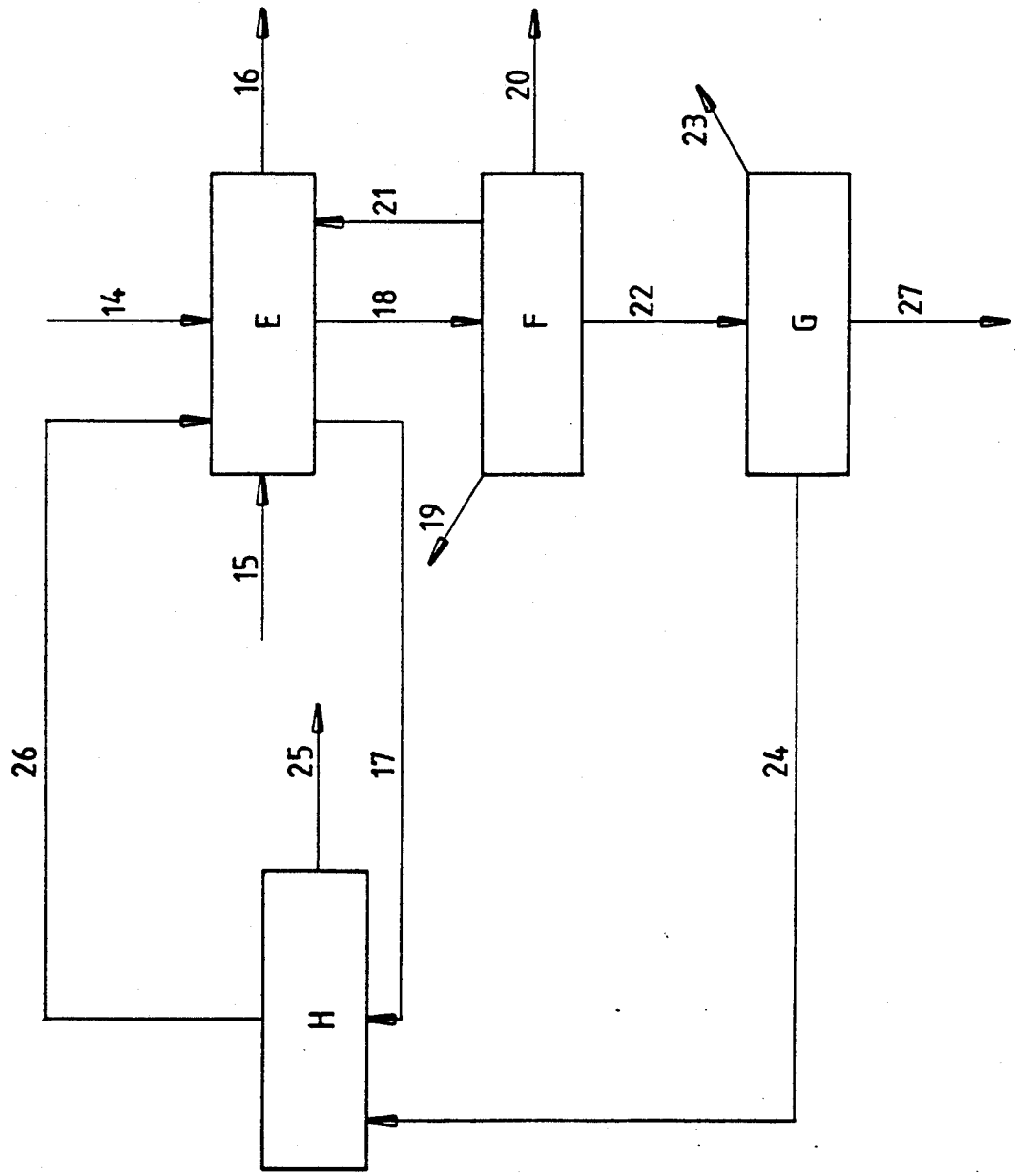

FIG. 2 is a schematic depiction of a flow chart for another embodiment of the invention.

This embodiment differs from the previous one essentially in that the sodium sulphate is dissolved in purified brine before being returned to the crude brine.

Crude brine (14) and Na$_2$SO$_4$ dissolved in purified brine (26) are fed to one or more vessels (E), in which the crude brine is purified. As various compounds (15) are added, impurities (16) precipitate and are separated and removed from (E). Part of the purified brine (17) is fed to a dissolver (H). The remaining purified brine (18) is fed to a brine evaporator (F). In the brine evaporator (F) water (19) evaporates, while NaCl (20) crystallises and after separation is removed from the brine evaporator (F). If desired, part of the mother liquor (21) is returned to (E). The remaining mother liquor (22) is fed to a mother liquor evaporator (G). In the mother liquor evaporator (G) water (23) evaporates, while Na$_2$SO$_4$ and NaCl (24) crystallize and after separation are fed to the dissolver (H). The Na$_2$SO$_4$ is dissolved in purified brine (17). The NaCl crystals (25) are removed from the dissolver (H). The concentrated mother liquor (27) is drained from the evaporator (G).

EXAMPLE 1

An example of the quantities employed in the process of the present invention is given below. According to the process depicted in FIG. 1, 3.374 m$^3$ of crude brine (1) containing 17706 moles of chloride ions, 156.9 moles of sulphate ions, 116.4 moles of calcium ions, 8.4 moles of magnesium ions, 40.5 moles of potassium ions, 1.2 moles of bromide ions, and the balance being made up of sodium ions, are added to the dissolver (A) together with 1744 moles of NaCl, 0.4 moles of potassium, 0.1 mole of bromide, and 168.5 moles of sodium sulphate.

102 kg of salt (2) containing 1744 moles of NaCl, 0.4 moles of potassium and 0.1 mole of bromide are separated and removed from (A). The crude brine enriched with Na$_2$SO$_4$ (3) is fed to vessel (B), to which are also added 19.9 moles of Na$_2$CO$_3$, 69.1 moles of Ca(OH)$_2$, and 59.2 moles of CO$_2$ (4), as well as 1.362 m$^3$ of mother liquor (9) from brine evaporator (C) containing 6991 moles of chloride ions, 637.4 moles of sulphate ions, 12.4 moles of carbonate, 8.8 moles of hydroxide ions, 118 moles of potassium ions, 2.9 moles of bromide ions, the balance being made up of sodium ions. Separated and removed from (8) are 110.6 moles of CaSO$_4$.2H$_2$O, 74.9 moles of CaCO$_3$, and 8.4 moles of Mg(OH)$_2$. The brine so purified (6), comprising 24697 moles of chloride ions, 852.2 moles of sulphate ions, 16.6 moles of carbonate ions, 11.8 moles of hydroxide ions, 158.5 moles of potassium ions, 4.1 moles of bromide ions, and the balance being made up of sodium ions, is fed to a brine evaporator (C). Water is removed by evaporation (7), whereupon 898 kg of salt containing 15 350 moles of NaCl, 0.8 moles of potassium ions, and 0.2 moles of bromide ions crystallize and are removed (8). Part of the mother liquor resulting from this evaporation is fed to vessel(s) (B) (9). The remaining mother liquor so obtained (10), containing 2356 moles of chloride ions, 214.8 moles of sulphate ions, 4.2 moles of carbonate ions, 3.0 moles of hydroxide ions, 39.7 moles of potassium ions, 1 mole of bromide ions, the balance being made up of sodium ions, is fed to evaporator (D), in which water is evaporated (11). Whereas the crystallized NaCl, Na$_2$SO$_4$, potassium, and bromide (13) are added to the crude brine (A), 0.105 m$^3$ of concentrated mother liquor (12) containing 612 moles of chloride ions, 46.3 moles of sulphate ions, 4.2 moles of carbonate ions, 3.0 moles of hydroxide ions, 39.3 moles of potassium ions, 0.9 moles of bromide ions, the balance being made up of sodium ions, are drained off from evaporator (D).

It is clear from this example that the salt product obtained (8) has a very low bromide and potassium content.

Comparative Example

Figure 3:
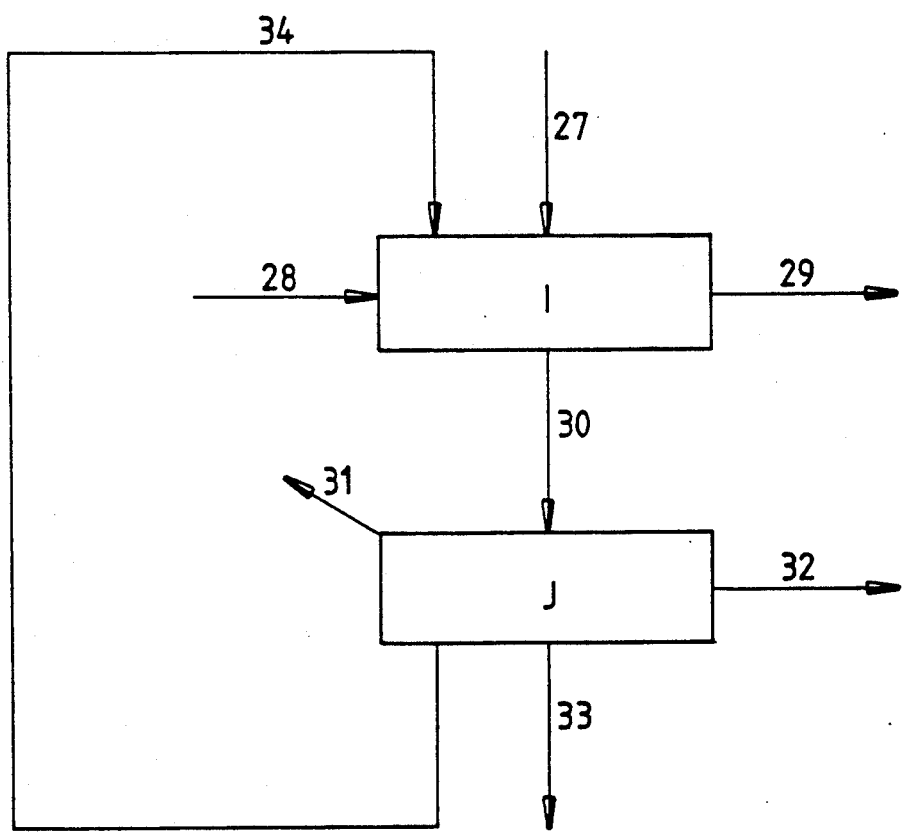
FIG. 3 is a schematic depiction of a prior art process.

A flow chart for a process for the preparation of NaCl according to the prior art is depicted schematically in FIG. 3.

An example of the quantities employed in the process according to the prior art is given below.

3.365 m$^3$ of crude brine (27) containing 17659 moles of chloride ions, 156.5 moles of sulphate ions, 116.1 moles of calcium ions, 8.4 moles of magnesium ions, 40.4 moles of potassium ions, 1.2 moles of bromide ions, and the balance being made up of sodium ions, are fed, together with 1.814 m$^3$ of mother liquor (34) containing 9490 moles of chloride ions, 879.8 moles of sulphate ions, 17.1 moles of carbonate ions, 12.2 moles of hydroxide ions, 621.5 moles of potassium ions, 9.8 moles of bromide ions, and the balance being made up of sodium ions,— to a vessel (I) in which the crude brine is to be purified. As 73.5 moles of calcium hydroxide, 21.8 moles of sodium carbonate, and 64.7 moles of carbon dioxide (28) are added, 104.1 moles of gypsum, 85.5 moles of calcium carbonate, and 8.4 moles of magnesium hydroxide (29) precipitate and are removed from (I). Purified brine (30) comprising 27149 moles of chloride ions, 932.2 moles of sulphate ions, 18.1 moles of carbonate ions, 12.9 moles of hydroxide ions, 661.9 moles of potassium ions, 11.,0 moles of bromide ions and the balance being made up of sodium ions, is fed to a brine evaporator (J). In the brine evaporator (J) water (31) evaporates, while 1000 kg of salt (32) containing 17094 moles of NaCl, 3.4 moles of potassium, and 0.6 moles of bromide crystallize and are removed from the brine evaporator (J). Drained off from the brine evaporator (J) are 0.108 $m^3$ of the mother liquor (33) containing 565 moles of chloride ions, 52.4 moles of sulphate ions, 1.0 mole of carbonate ions, 0.7 moles of hydroxide ions, 37.0 moles of potassium ions, 0.6 moles of bromide ions, and the balance being made up of sodium ions. The remaining mother liquor (34) is returned to (I).

The Comparative Example shows that the bromide content of the salt 10 thus obtained (32) is over 2.5 times as high as that of the salt (8) obtained by the process of the present invention. It was found impossible to remove the potassium and bromide impurities by washing the obtained salt.

I claim:

1. A process for the preparation of sodium chloride from crude brine containing calcium ions and magnesium ions which comprises adding sodium carbonate, calcium hydroxide and sodium sulphate to said brine to form calcium carbonate, magnesium hydroxide and calcium sulfate as insoluble compounds; separating said insoluble compounds from the crude brine to obtain a purified brine; evaporating water from the purified brine and separating the sodium chloride crystallized in the process leaving a mother liquor; and, crystallizing and separating sodium sulfate from the mother liquor and returning the sodium sulfate to the crude brine to be purified.

2. The process of claim 1 wherein crystallized sodium sulfate is dissolved in water or an aqueous solution before it is added to the crude brine to be purified.

3. The process of claim 2 wherein the crystallized sodium sulfate is dissolved in purified brine.

4. The process of claim 2 wherein the crystallized sodium sulfate is dissolved in crude brine to be purified in an amount effective to obtain a sulfate ion content in said crude brine of not greater than 0.22 gram-ion/liter.

5. The process of claim 4, wherein the product of the calcium ion content and the sulfate ion content of the brine after complete dissolution of the sodium sulfate does not exceed $7.5 \times 10^{-3}$ (gram-ion/liter)$^2$.

6. The process of claim 1 wherein the evaporation of water from the purified brine proceeds until the solubility limit of sodium sulfate is reached.

* * * * *